United States Patent
Karaffa et al.

(10) Patent No.: US 8,937,555 B2
(45) Date of Patent: Jan. 20, 2015

(54) SYSTEMS AND METHODS TO OVERLAY BEHAVIORS ON FOUNDATION FIELDBUS ALERTS

(75) Inventors: John Michael Karaffa, Roanoke, VA (US); Johnny Stephen Downor, Salem, VA (US); Steven William Smith, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 788 days.

(21) Appl. No.: 13/149,746

(22) Filed: May 31, 2011

(65) Prior Publication Data

US 2012/0310380 A1 Dec. 6, 2012

(51) Int. Cl.
G08B 21/00 (2006.01)
G05B 19/042 (2006.01)

(52) U.S. Cl.
CPC .................................. *G05B 19/0425* (2013.01)
USPC ......... 340/691.1; 340/635; 702/184; 702/188

(58) Field of Classification Search
USPC ................................................ 702/184, 188
See application file for complete search history.

(56) References Cited

U.S. PATENT DOCUMENTS

| | | | |
|---|---|---|---|
| 2002/0163427 A1* | 11/2002 | Eryurek et al. | 340/500 |
| 2003/0014500 A1* | 1/2003 | Schleiss et al. | 709/218 |
| 2004/0024572 A1* | 2/2004 | Pagnano et al. | 702/188 |
| 2005/0012608 A1* | 1/2005 | Havekost et al. | 340/517 |
| 2008/0255681 A1* | 10/2008 | Scott et al. | 700/12 |
| 2009/0277374 A1* | 11/2009 | Schie et al. | 116/109 |
| 2010/0123722 A1 | 5/2010 | Grubbs et al. | |
| 2012/0310383 A1* | 12/2012 | Karaffa et al. | 700/80 |

OTHER PUBLICATIONS

U.S. Appl. No. 13/149,764, filed May 31, 2011, Karaffa et al.
U.S. Appl. No. 13/149,789, filed May 31, 2011, Karaffa et al.
U.S. Appl. No. 13/149,816, filed May 31, 2011, Karaffa et al.
U.S. Appl. No. 13/149,826, filed May 31, 2011, Karaffa et al.
U.S. Appl. No. 13/149,597, filed May 31, 2011, Karaffa et al.
U.S. Appl. No. 13/149,833, filed May 31, 2011, Karaffa et al.
U.S. Appl. No. 13/149,803, filed May 31, 2011, Karaffa et al.
U.S. Appl. No. 13/149,660, filed May 31, 2011, Karaffa et al.
U.S. Appl. No. 13/149,706, filed May 31, 2011, Karaffa et al.
U.S. Appl. No. 13/149,811, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
http://zone.ni.com/devzone/cda/tut/p/id/3345, 12 pages, last viewed Aug. 2, 2011.

* cited by examiner

*Primary Examiner* — Jeffery Hofsass
(74) *Attorney, Agent, or Firm* — Fletcher Yoder, P.C.

(57) ABSTRACT

An industrial control system is provided that includes a field device configured to receive only a first plurality of behaviors for the alert and a controller of an industrial control system, wherein the controller is configured to receive the alert and overlay a second plurality of behaviors on the alert, and the controller is configured to process one or more of the second plurality of behaviors differently than the first plurality of behaviors.

20 Claims, 5 Drawing Sheets

SYSTEMS AND METHODS TO OVERLAY BEHAVIORS ON FOUNDATION FIELDBUS ALERTS

BACKGROUND OF THE INVENTION

The subject matter disclosed herein relates to industrial control systems and, more specifically, to the communication and processing of alerts in an industrial control system.

Certain systems, such industrial control systems, may provide for control capabilities that enable the execution of control instructions in various types of devices, such as sensors, pumps, valves, and the like. Additionally, certain industrial control systems may include one or more graphical user interfaces that may provide for a user to interact with the alert. For example, a graphical user interface may present an operator with alerts that may contain alarm or diagnostic information about a device on the control system network.

BRIEF DESCRIPTION OF THE INVENTION

In one embodiment, a system is provided that includes a field device configured to provide an alert, wherein the field device is configured to receive only a first plurality of behaviors for the alert and a controller of an industrial control system, wherein the controller is configured to receive the alert and overlay a second plurality of behaviors on the alert, and the controller is configured to process one or more of the second plurality of behaviors differently than the first plurality of behaviors.

In another embodiment, a method is provided that includes receiving, at a controller of an industrial control system, a user behavior for an alert of a field device, determining, by a processor of the controller, if the user behavior comprises one of a first plurality of behaviors or one of a second plurality of behaviors, and processing, by a processor of the controller, the user behavior based on the determination.

In another embodiment, a non-transitory tangible machine-readable media is provided that includes executable code stored thereon. The executable code includes instructions for receiving, at a controller of an industrial control system, a user behavior for an alert of a field device, determining, by a processor of the controller, if the user behavior comprises one of a first plurality of behaviors or one of a second plurality of behaviors, and processing, by a processor of the controller, the user behavior based on the determination.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The Foundation Fieldbus standard includes the concept of Foundation Fieldbus alerts, which are used by Foundation Fieldbus devices to inform a controller or other component of an industrial control system of events or alarms that devices may experience. The Foundation Fieldbus standard may provide user behaviors that may be applied to the alert to change the state of the alert. However, the Foundation Fieldbus alert is limited to responding to those user behaviors provided by the Foundation Fieldbus standard.

Embodiments of the invention discussed below provide for the overlay of additional user behaviors on a Foundation Fieldbus alert. For example, the embodiments may include the overlay of a second set of user behaviors on a Foundation Fieldbus alert having a first set of user behaviors. In some embodiments, a Foundation Fieldbus alert may be generated by a device and transmitted to a controller. The controller may overlay a second set of user behaviors on the alert. Upon selection of a command to execute one of the user behaviors, the controller may process the user behavior based on the command. For example, if the user behavior is supported by Foundation Fieldbus, the controller may transmit the user behavior to a Foundation Fieldbus device. If the user behavior is not supported by Foundation Fieldbus, the controller may update a state of the alert separately stored on the controller.

Figure 1:
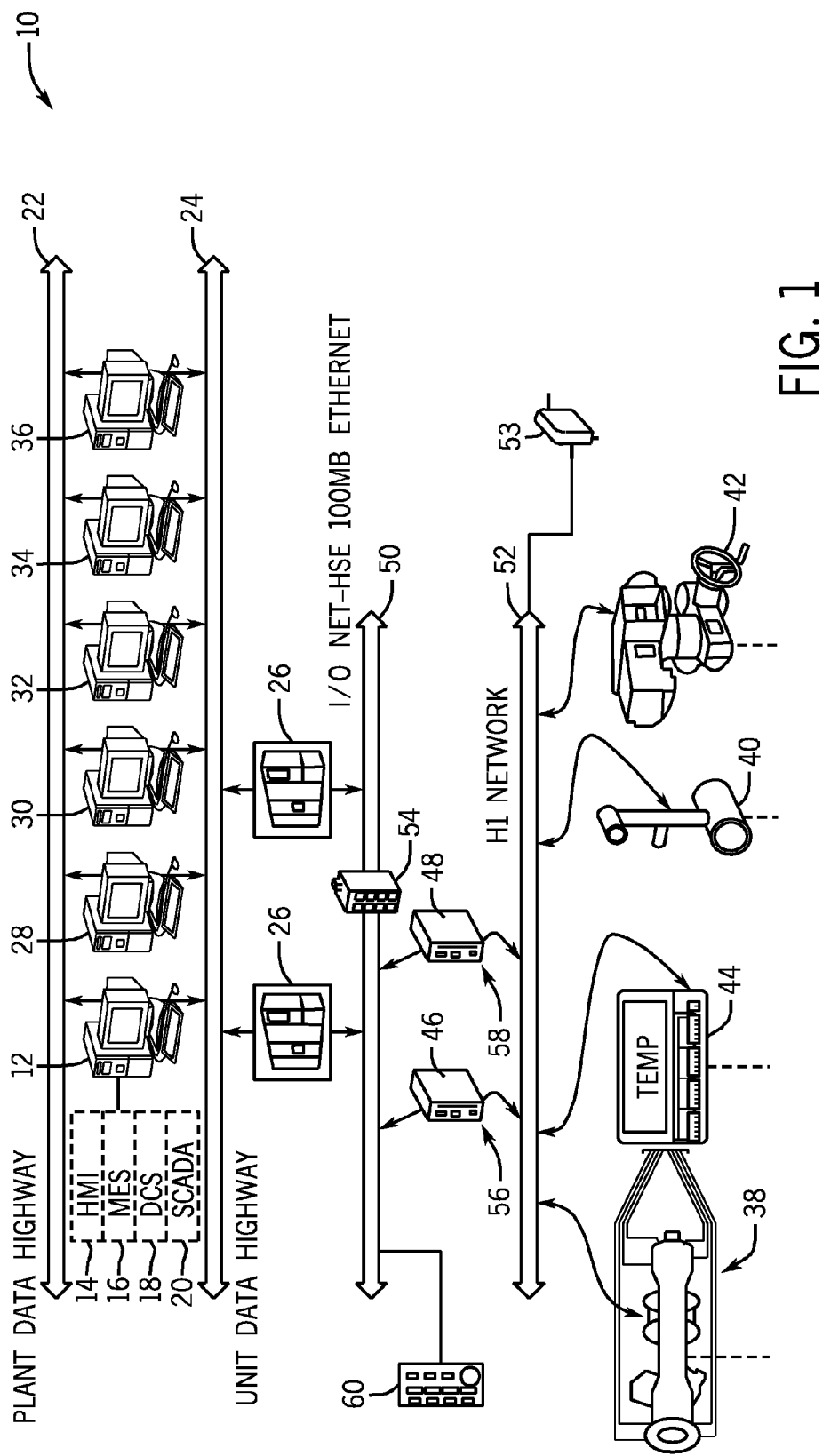
FIG. 1 is a schematic diagram of an embodiment of an industrial control system, including a communications bus.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three, or more industrial controllers for redundancy. The industrial controllers 26 may enable control logic useful in automating a variety of plant equipment, such as a turbine system 38, a valve 40, and a pump 42. Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

A variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

Figure 2:
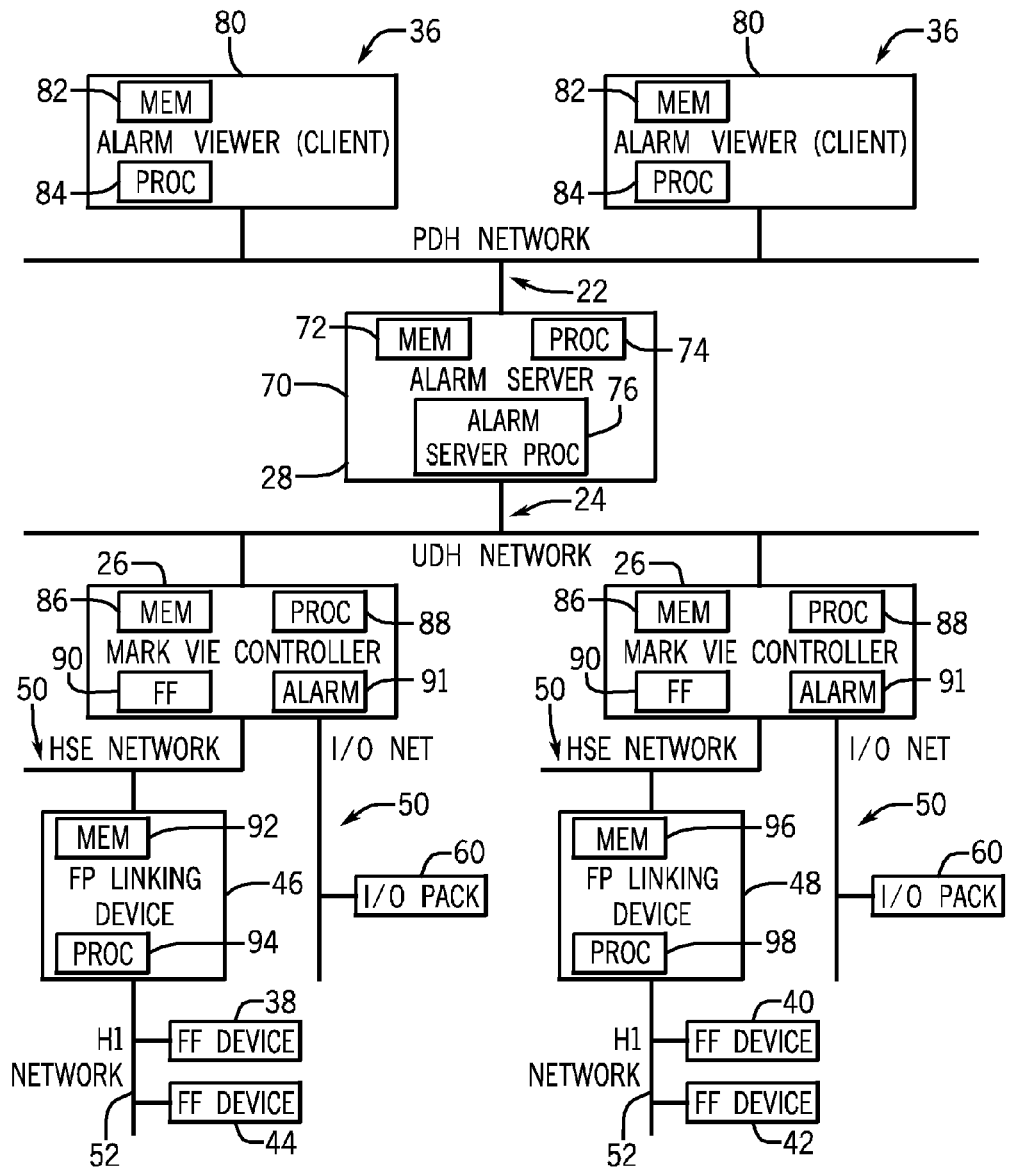
FIG. 2 is a block diagram including embodiments of various components of the industrial control system of FIG. 1.

In certain embodiments, the devices 38, 40, 42, and 44 may provide data, such as alerts, to the system 10. These alerts may be handled in accordance with the embodiments described below. FIG. 2 depicts a block diagram of an embodiment of the industrial process control system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm server process 76 for receiving, processing, and responding to alarms received from the controllers 26. Multiple controllers, such as the controllers 26 may be set up for redundant operations.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a Fieldbus process 90 and an alarm process 91. The Fieldbus process 90 may be used to interface with the field devices 38, 40, 42, and 44 while the alarm process 91 may be used to provide for a centralized facility suitable for distributing alarm information. As mentioned above, the controllers 26 may be coupled to the I/O pack 60 over the I/O NET 50. In one embodiment, the I/O pack 60 may communicate with the controllers 26 using the advanced digital logic (ADL) protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may also be coupled to the H1 network 52, and one linking device 46 may be coupled to devices 38 and 44 and another linking device 48 may be coupled to devices 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the Foundation Fieldbus protocol.

The system 10 may enable alert and diagnostic information to be communicated from the various devices to a user, such as through the HMI 14 and the alarm viewers 80. For example, the Foundation Fieldbus devices 38, 40, 42, and 44 may provide an alert to the controller 26. The alert may be provided from the controller 26 to the alarm server 70, which may process the alert and provide information to the HMI 14, the alarm viewers 80, or any other computers coupled to the unit data highway 24 or plant data highway 22.

As such, the Foundation Fieldbus standard relies on Foundation Fieldbus alerts, which are used by Foundation Fieldbus devices (e.g., devices 38, 40, 42, and 44) to communicate to the system controllers (e.g., controller 26) alarms and diagnostic information regarding the status of the devices. The Foundation Fieldbus may provide for a limited number of actionable user behaviors for the alerts that enable a user to change the state of the alert. However, some components of the industrial control system 10 may be able to respond and use additional user behaviors not provided by the parameters included with the Foundation Fieldbus alerts. Additionally, a user may wish to select additional user behaviors when responding to an alert.

Figure 3:
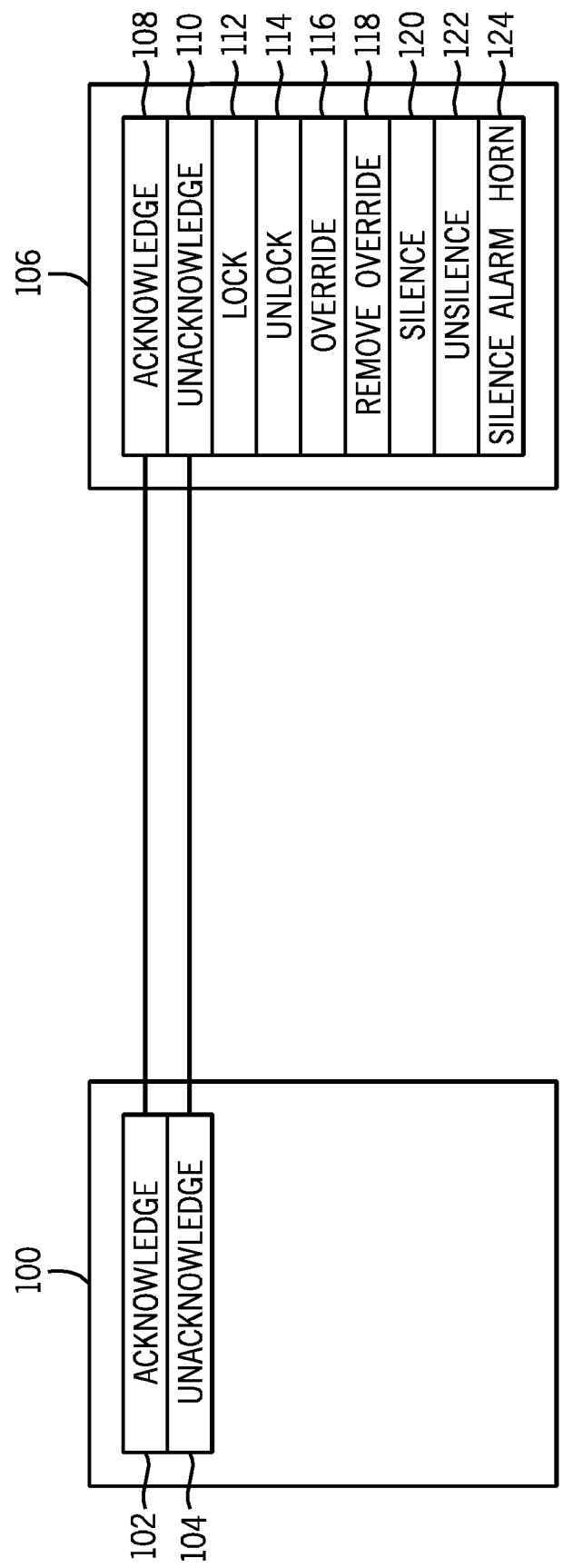
FIG. 3 is a block diagram depicting the overlay of additional user behaviors on Foundation Fieldbus user behaviors in accordance with an embodiment of the present invention.

FIG. 3 is a block diagram depicting the overlay of additional user behaviors that may be performed on a Foundation Fieldbus alert in accordance with an embodiment of the present invention. As shown in FIG. 3, the Foundation Fieldbus standard (block 100) may support two behaviors, Acknowledge (block 102) and Unacknowledge (block 104). The controller 26 may overlay additional user behaviors (block 106) on the alert. These user behaviors 106 may be presented to a user in a graphical user interface, such as through the alarm server 70, the HMI 14, the alarm viewers 80, or other components of the system 10. The user may select a user behavior command to apply one of the user behaviors to an alert. The user behaviors 106 may include Acknowledge (block 108) and Unacknowledge (block 110) that correspond to the Acknowledge (block 102) and Unacknowledge (block 104) behaviors of the Foundation Fieldbus standard (block 100). Additionally, the user behaviors 106 may include Lock (block 112), Unlock (block 114), Override (block 116), Remove Override (block 118), Silence (block 120), Unsilence (block 122), and Silence Alarm Horn (block 124). The Lock (block 112) behavior may enable a user to still see the alarm without acknowledging or changing the state of the alarm. The Unlock (block 114) behavior may enable a user to remove the Lock behavior applied to an alert. The Override (block 116) behavior may enable a user to override an alert presented to the user. The Remove Override (block 118) behavior may enable a user to remove the Override behavior applied to alert. The Silence (block 120) and Unsilence (block 122) behaviors may enable a user to silence or unsilence the sound associated with an alert. The Silence Alarm Horn (block 124) may enable a user to silence a general alarm horn sound that activates for an alert.

Figure 4:
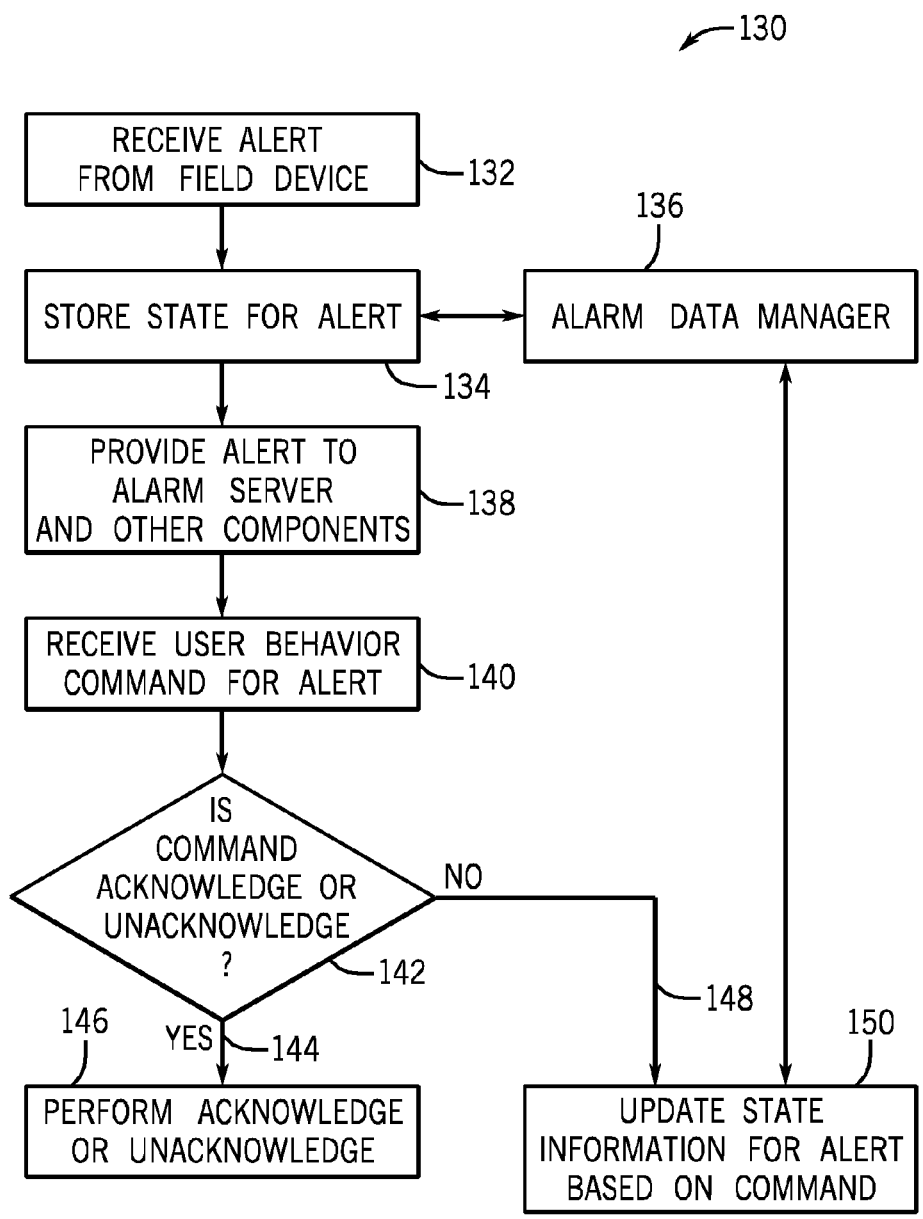
FIG. 4 is flowchart of a process for the overlay of additional user behaviors on a Foundation Fieldbus alert in accordance with an embodiment of the present invention.

FIG. 4 depicts a process 130 for overlying and processing the additional user behaviors for a Foundation Fieldbus alert in accordance with an embodiment of the present invention. Some or all aspects of the process 130 may be implemented as executable code instructions stored on a non-transitory tangible machine-readable medium and executed by a processor, such as the memory 86 and processor 88 of the controller 26, the memory 72 and the processor 74 of the alarm server, and the memory 82 and processor 84 of the alarm viewer 80. Initially, a controller, e.g., controller 26, may receive an alert from a field device (block 132), e.g., a Foundation Fieldbus device such as field device 38. For example, the field device 38 may generate an alert for an alarm and the alert may be transmitted, such as through a multicast broadcast, to the linking device 56. The linking device 56 may then transmit the alert to the controller 26.

Next, the controller may store the state for the alert (block 134), such as in an alarm data manager 136. In certain embodiments, the alarm data manager 136 may be a multi-dimensional data warehouse or any other suitable data store (e.g., relational database, network database, binary file). The state of the alert may include any parameters transmitted from the field device with the alert. The controller may then provide the alert to an alarm server (block 138), e.g., the alarm server 70, which may in turn provide the alert to other components of the industrial control system 10. A user may view and interact with the alert on a graphical user interface, such as through the alarm viewers 80, the HMI 14, the MES 16, the DCS 18, the SCADA system 20, or other components of the system 10. The user may then select a user behavior to apply to the alert (referred to as a "user behavior command"). The user behaviors selected may include, for example, the behaviors listed above such as Acknowledge, Unacknowledge, Lock, Unlock, Override, Remove Override, Silence, Unsilence, and Silence Alarm Horn.

The alarm server, e.g., alarm server 70, and the controller, e.g., controller 26, may receive the user behavior command for the alert (block 140). Upon receipt of the user behavior, the controller may determine if the user behavior of the command is the Acknowledge behavior or the Unacknowledge behavior (decision block 142). Because these behaviors are supported by Foundation Fieldbus, if the behavior is either Acknowledge or Unacknowledge (arrow 144), the controller may perform the Acknowledge or Unacknowledge by executing the appropriate Foundation Fieldbus action (block 146). The Acknowledge or Unacknowledge may be written to the field device that generated the alert in accordance with the Foundation Fieldbus standard. In contrast, if the received user behavior is not Acknowledge or Unacknowledge but is instead one of the overlaid user behaviors (arrow 148), the controller may update the state information for the alert based on the user behavior (block 150), such as by locking the alert, unlocking the alert, silencing the alert, and so on. As described above, updating the state of an alert may include writing the state to the alarm data manager 136.

Figure 5:
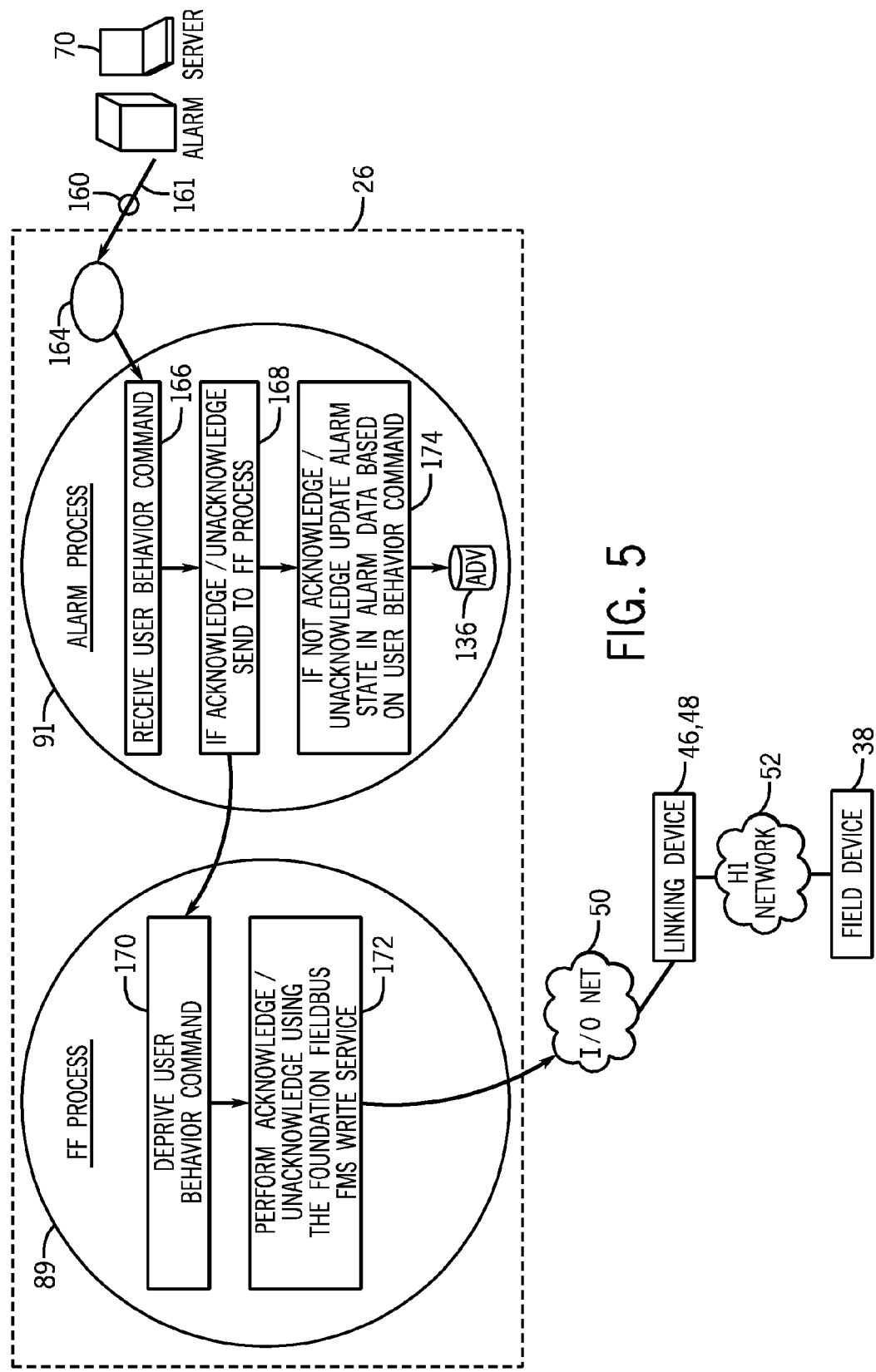
FIG. 5 is a process diagram illustrating an embodiment of a user behavior command request process.

FIG. 5 illustrates processing of the behavior commands described above in accordance with an embodiment of the industrial process control system 10. As noted above, the controller 26 may include the Foundation Fieldbus 89 and the alarm process 91 shown in FIG. 5. Upon observing an active alert, the user of an SDI client (e.g., the alarm server 70) may desire to perform an action on the alert. The SDI client (e.g., the alarm server 70) sends a user behavior command 160 to the alarm process 91 (line 162) of the controller 26, such as through an SDI process 164 executing on the controller 26. The alarm process 91 receives the user behavior command 160 (block 166), such as in the SDI format. If the user behavior command 160 includes an Acknowledge or Unacknowledge behavior, the alarm process 91 sends the user behavior command 160 to the Foundation Fieldbus process 89 (block 168), as these behaviors are supported by Foundation Fieldbus. Upon receiving an Acknowledge or Unacknowledge user behavior command (block 170), the Foundation Fieldbus process 89 performs the user behavior command 160 by using the Foundation Fieldbus FMSwrite service (block 172) to write to a field device (e.g., field device 38) over the H1 network 52 to Acknowledge or Unacknowledge the alert.

Alternatively, if the user behavior command 160 includes one of the overlaid user behaviors (e.g., Lock, Unlock, Override, Remove Override, Silence, Unsilence, and Silence Alarm Horn), the alarm process 91 updates the alert state within the alarm process 91 (block 174) based upon the user behavior command 160 by updating the alarm data manager 136.

Technical effects of the invention include the overlay of additional user behaviors on a Foundation Fieldbus alert of a Foundation Fieldbus device. Additional technical effects include providing additional user behaviors not supported by Foundation Fieldbus for use in a control system for processing of the alert. Additional technical effects include providing a process for handling the user behaviors supported by Foundation Fieldbus and the user behaviors not supported by Foundation Fieldbus.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a field device configured to provide an alert, wherein the field device is configured to receive only a first plurality of behaviors for the alert, wherein the first plurality of behaviors adhere to a first industrial communications protocol alert behavior; and
a controller of an industrial control system, wherein the controller is configured to receive the alert and overlay a second plurality of behaviors on the alert, wherein the second plurality of behaviors are not included in the first industrial communications protocol, and the controller is configured to process one or more of the second plurality of behaviors differently than the first plurality of behaviors, and wherein at least one of the second plurality of behaviors comprises an alert Lock behavior.

2. The system of claim 1, wherein the second plurality of behaviors are visually displayed via a client communicatively coupled to the controller and configured to enable a user to select one of the first or the second plurality of behaviors in response to the alert.

3. The system of claim 1, wherein the first industrial communications protocol comprises a Foundation Fieldbus protocol and the field device comprises a Foundation Fieldbus device.

4. The system of claim 3, wherein the first industrial communications protocol comprises a Foundation Fieldbus protocol, the alert comprises a Foundation Fieldbus alert and the first plurality of behaviors comprises a first Acknowledge behavior and a first Unacknowledge behavior.

5. The system of claim 1, wherein the controller is configured to write directly to the field device when the behavior is selected by a user.

6. The system of claim 5, wherein the controller is configured to communicate with an alarm server communicatively coupled to the controller and to update the alarm server when any one of the second plurality of behaviors is selected by the user.

7. The system of claim 1, wherein the one or more of the second plurality of behaviors comprises an Unlock behavior, an Override behavior, a Remove Override behavior, a Silence behavior, an Unsilence behavior, a Silence Alarm Horn behavior, or a combination thereof.

8. The system of claim 1, comprising an alarm server, wherein the controller is configured to transmit the alert to the alarm server, and wherein the alarm server is configured to determine if the alert is associated with the first plurality of behaviors or with the second plurality of behaviors, and if associated with the first plurality of behaviors to execute a Foundation Fieldbus process, and if associated with the second plurality of behaviors, to store an alert state via an alarm data manager.

9. The system of claim 1, comprising a graphical user interface configured to provide the second plurality of behaviors for selection by a user.

10. A method, comprising:
receiving, at a controller of an industrial control system, a user behavior for an alert of a field device;
determining, by a processor of the controller, if the user behavior comprises one of a first plurality of behaviors or one of a second plurality of behaviors; and
processing, by a processor of the controller, the user behavior based on the determination, wherein the first plurality of behaviors adhere to a first industrial communications protocol alert behavior and the second plurality of behaviors are not included in the first industrial communications protocol, and wherein at least one of the second plurality of behaviors comprises an alert Lock behavior.

11. The method of claim 10, wherein processing the user behavior comprises transmitting the behavior directly to the field device if the user behavior comprises one of the first plurality of behaviors.

12. The method of claim 10, wherein processing the user behavior comprises changing a state of the alert via an alarm server if the user behavior comprises one of the second plurality of behaviors.

13. The method of claim 12, wherein changing the state of the alert comprises updating an alarm data manager included in the alarm server and storing the state of the alert.

14. The method of claim 10, wherein the first industrial communications protocol comprises a Foundation Fieldbus protocol, the field device comprises a Foundation Fieldbus device, and the alert comprises a Foundation Fieldbus alert.

15. The method of claim 14, wherein the first plurality of behaviors comprises an Acknowledge behavior and an Unacknowledge behavior.

16. The method of claim 15, wherein the second plurality of behaviors comprises an Unlock behavior, an Override behavior, a Remove Override behavior, a Silence behavior, an Unsilence behavior, a Silence Alarm Horn behavior, or a combination thereof.

17. A non-transitory tangible machine-readable media having executable code stored thereon, the executable code comprising instructions for:
- receiving, at a controller of an industrial control system, a user behavior for an alert of a field device;
- determining, by a processor of the controller, if the user behavior comprises one of a first plurality of behaviors or one of a second plurality of behaviors; and
- processing, by a processor of the controller, the user behavior based on the determination, wherein the first plurality of behaviors adhere to a first industrial communications protocol alert behavior and the second plurality of behaviors are not included in the first industrial communications protocol, and wherein at least one of the second plurality of behaviors comprises an alert Lock behavior.

18. The non-transitory tangible machine-readable media of claim 17, wherein the instructions for processing the user behavior comprise instructions for directly transmitting the user behavior to the field device if the user behavior comprises one of the first plurality of behaviors.

19. The non-transitory tangible machine-readable media of claim 17, wherein the instructions for processing the user behavior comprise instructions for changing a state of the alert via an alarm server if the user behavior comprises one of the second plurality of behaviors.

20. The non-transitory tangible machine-readable media of claim 17, wherein the first industrial communications protocol comprises a Foundation Fieldbus protocol, the field device comprises a Foundation Fieldbus device, and the alert comprises a Foundation Fieldbus alert.

* * * * *